United States Patent Office 3,715,323
Patented Feb. 6, 1973

3,715,323
NITRATION OF AROMATIC RING-CONTAINING COMPOSITIONS
James V. Crivello, Mechanicville, N.Y., assignor to General Electric Company
No Drawing. Original application Oct. 23, 1969, Ser. No. 868,917, now Patent No. 3,634,520. Divided and this application Feb. 25, 1971, Ser. No. 119,006
Int. Cl. C08f 7/10, 7/04; C08g 20/38
U.S. Cl. 260—47 ET        9 Claims

ABSTRACT OF THE DISCLOSURE

Certain aromatic organic compositions containing benzenoid-substituted hydrogen are readily nitrated by treatment with a mixture comprising a perfluoro saturated aliphatic acid anhydride of from 4 to 8 carbon atoms and a nitrating agent of either metal nitrates or ammonium nitrate.

---

This application is a division of application Ser. No. 868,917, filed Oct. 23, 1969, now U.S. Pat. No. 3,634,520, and assigned to the same assignee as the present application.

This invention is concerned with a process for nitrating aromatic ring compositions. More particularly, the invention is concerned with a process for nitrating compositions containing aromatic carbocyclic radicals having benzenoid hydrogen thereon, which process comprises treating an aromatic composition selected from the class consisting of aromatic hydrocarbons, halogenated aromatic hydrocarbons (where the halogen can be on the aromatic nucleus or on a hydrocarbon substituent thereof); cyanoaromatic hydrocarbons, carboxy aromatic hydrocarbons, aryloxy and alkoxy aromatic hydrocarbons, halogenated aryloxy and alkoxy aromatic hydrocarbons, and organic polymers containing aromatic hydrocarbon and halogenated aromatic hydrocarbon groups in either their backbone structures or as pendant groups, with a mixture of ingredients comprising a perfluoro saturated aliphatic acid anhydride of from 4 to 8 carbon atoms and a nitrating agent selected from the class consisting of metal nitrates and ammonium nitrate.

The nitration of organic compositions, particularly aromatic compositions, is well known and is an important industrial process for making organic chemicals and compositions which can be synthetic intermediates for a wide variety of other compounds. In the past, a number of nitrating agents have been widely used and have been well described in the literature. Among the reagents which have been employed for nitration of organic compounds include nitric acid, mixtures of nitric acid and sulfuric acid, nitric acid and acetic acid, etc. A recent U.S. Pat. 3,417,127, issued Dec. 17, 1968, describes the nitration of alkanes, including saturated cycloalkanes, by contacting the alkane hydrocarbon with a mixture of trifluoroacetic anhydride and nitric acid of a concentration ranging from about 90 to 100 weight percent at a temperature between about −20° and 50° C.

In general the prior art methods for the nitration of simple aromatic compounds have generally been fairly satisfactory. However, when attempts are made to nitrate certain aromatic compositions, particularly organic polymers containing aromatic nuclei in the polymer backbone, one finds that often it is difficult to effect rapid nitration of the aromatic nucleus or to introduce more than one nitro group per aromatic ring; in the case of polymers, it has been found that the usual nitrating agents tended to decompose the polymer under conventional nitrating conditions. Mainly, the decomposition disadvantage manifests itself when employing nitric acid, as in the aforementioned U.S. 3,417,127, because of the concomitant presence of water when nitric acid is used.

Unexpectedly I have discovered that I am able to nitrate organic compositions of the above class containing aromatic nuclei by employing as the nitrating medium, a mixture of a perfluoro saturated aliphatic acid anhydride of from 4 to 8 carbon atoms and a nitrating agent (hereinafter so designated) selected from the class consisting of metal nitrates and ammonium nitrate.

The advantages of employing this particular set of reactants and conditions are as follows. The procedure for nitrating is basically simple involving readily available starting materials and conventional apparatus. The conditions for nitration are relatively mild and can be used to nitrate compounds which ordinarily decompose when employing the conventional nitrating systems. Furthermore, the nitrating agent employed can be measured out precisely so that control over the reaction is conveniently maintained. Furthermore, once the nitration reaction has been completed, the reaction mixtures are readily worked up since any excess perfluoro anhydride can be readily removed by application of mild heating conditions or even by a low temperature distillation. Additionally, the use of inorganic nitrates involves relatively low cost materials which are readily available in a high state of purity. Furthermore, the anhydride employed can be readily regenerated and be recovered for use again. Finally, the yields which are realized by employment of my nitrating process are, under comparable conditions, generally higher than other nitrating methods, with little or no interfering organic by-product.

I have found that the nitration of compositions containing aromatic nuclei in accordance with my process involve a different type of mechanism than is employed in the nitration of alkanes. Thus, the reaction of aromatic compositions with, for instance, ammonium nitrate and trifluoroacetic anhydride involves a nitronium ion, $NO_2^+$. This strongly electrophilic species reacts with the aromatic ring to generate a sigma-complex which then loses a proton rapidly to form the product in accordance with the following equation as an example:

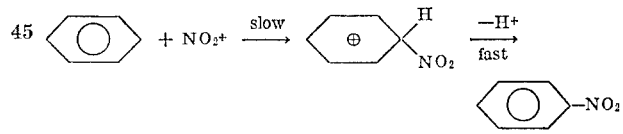

In contrast to this, the direct nitration, for example, of alkanes with nitric acid and trifluoroacetic acid involves a free radical nitration in which oxides of nitrogen, such as $NO_2$, are the active agents. Generally, oxides of nitrogen or dilute nitric acid are used in such a reaction under rather high temperature conditions causing fragmentation of the carbon skeleton with resultant breaking of C—H and C—C bonds and their replacement by a nitro group. As a result of the free radical nature of this type of reaction, primary hydrogens are least susceptible to attack while tertiary hydrogens are attacked more easily; and free radical generators such as small amounts of chlorine act as promoters. In this type of system involving the use of nitric acid and trifluoroacetic acid anhydride, oxides of nitrogen are apparently produced which are responsible for the products observed.

I have found that the presence of a hydroxyl (OH) group on the aromatic nucleus, such as in the case of phenol, results initially in the oxidation to a quinone structure rather than nitration on the ring. The discovery that hydroxyl-substituted aromatic composition can be oxidized in this manner is more particularly disclosed and claimed in my copending application S.N. 868,917 filed concurrently herewith and assigned to the same assignee as the present invention, now U.S. 3,678,081, issued July 18, 1972. I have additionally found that the presence of a nitro group on the aromatic nucleus seems to inhibit further nitration of that ring. I have further found that an aromatic ring attached directly to an atom of lower valence which is capable of being oxidized to a higher valence, for instance, in the case of triphenyl phosphine, again undergoes an oxidation reaction rather than a nitration reaction, to form triphenyl phosphine oxide.

The term "aromatic group having benzenoid-substituted hydrogen" is intended to mean any aromatic nucleus in which one of the valences thereon is substituted by nuclear-substituted hydrogen.

Among the perfluoro saturated aliphatic acid anhydrides of from 4 to 8 carbon atoms which may be employed in the practice of the present invention may be mentioned, for instance, trifluoroacetic anhydride (identified as TFAA), pentafluoro propionic acid anhydride, septafluoro butyric acid anhydride, the mixed anhydride obtained from trifluoro acetic acid and pentafluoro propionic acid, etc.

The metallic nitrate (in addition to the ammonium nitrate) which is employed in the practice of the present invention advantageously has the general formula (I) $(M)_x(NO_3)_y$ where M is a metal atom and the valences $x$ and $y$ of the metal and of the nitrate group can be varied depending upon the particular metal employed; accordingly, the number of nitrate groups in the metal nitrate will also be varied depending on the valence of the metal atom. Among such metal nitrates which may be employed may be mentioned, for instance, sodium nitrate, potassium nitrate, copper nitrate including the cupric and cuprous forms, cadmium nitrate, lead nitrate, silver nitrate, zirconium nitrate, chromium nitrate, etc. Various metal salts containing varying molecules of water of hydration are included within the term "metal nitrate." It is preferred that the nitrate employed be either an alkali-metal nitrate such as sodium nitrate or ammonium nitrate because of their inexpense, ready availability, purity and the ability to readily isolate and remove from the reaction mixture, any salts derived from the nitrate.

The aromatic compounds which can be nitrated in accordance with the practice of the present invention are many. The aromatic composition may be a simple compound, or a more complex compound, or it may be a polymeric composition containing an aromatic nucleus or aromatic nuclei in which there is present benzenoid unsaturation to which is attached at least one hydrogen which can be the site for the nitrate group.

Among the simple, i.e. non-polymeric aromatic compositions which may be employed in the practice of the present invention may be mentioned, for instance, aromatic hydrocarbons (e.g., benzene, naphthalene, anthracene, biphenyl, terphenyl, etc.); aliphatic-substituted aromatic hydrocarbons (e.g., toluene, xylene, ethylbenzene, alphamethylnaphthalene, dihexyl benzene, diphenylmethane, 2,2-diphenylpropane, styrene, allyl benzene, divinyl benzene, etc.); halogenated aromatic hydrocarbons and halogenated aliphatic-substituted aromatic hydrocarbons (e.g., chlorobenzene, dichlorobenzene, tetrachlorobenzene, trifluorobenzene, dichloronaphthalene, 1,4-chlorotoluene, dibromoanthracene, 3,3′,5,5′-tetrachloro-diphenylmethane, α,α-dichloroethylbenzene, etc.); aliphatic ethers of aromatic hydrocarbons, including alkyl derivatives (e.g., methyl phenyl ether, ethyl phenyl ether, ethyl naphthyl ether, propargyl phenyl ether, allyloxybenzene, etc.); cyanoaromatic hydrocarbons (e.g., cyanobenzene, terephthaloyl nitrile, etc.); carboxy aromatic hydrocarbons (e.g., benzoic acid, isophthalic acid, naphthoic acid, meta-toluic acid, etc.); aryloxy aromatic hydrocarbons (e.g., diphenyl ether, phenoxy naphthalene, etc.); halogenated aliphatic and aromatic ethers of aromatic hydrocarbons (e.g., dichlorodiphenyl oxide, tetrachlorodiphenyl oxide, 4-chlorophenoxy methane, etc.) etc.

Included among the many polymers which contain an aromatic nucleus either in the backbone of the polymer or as a pendant group are, for instance, polystyrene, polyphenylene oxides, such as shown in U.S. 3,306,875; polyethylene terephthalate; epoxy resins such as described in U.S. 2,840,540; polycarbonate resins such as recited in U.S. 3,028,365; organopolysiloxane resins such as shown in U.S. Patents 2,258,219, 2,258,221–222; polyimide resins and polyamide acid resins such as described in U.S. 3,179,633–634; polyamide resins such as described in U.S. 3,418,275; polyarylene polyethers such as shown in U.S. 3,332,909; aromatic polyesters such as those described in U.S. Pats. 3,036,990–992 and 3,160,602–605, etc. Other aromatic polymers containing the requisite aromatic nuclei which can be employed in the practice of the present invention are well known and documented in the art.

The ratio of the ingredients employed in my process can be varied widely. Thus, the molar ratio of the perfluorinated aliphatic acid anhydride to the metal nitrate or ammonium nitrate can be between about 25 to 1 and 1 to 25. The molar ratio of the ammonium nitrate or the metal nitrate to the aromatic compound can also be varied widely and advantageously is between about 15 to 1 and 1 to 15; while the molar ratio of the perfluorinated aliphatic acid anhydride to the aromatic compound is between about 25 to 1 and 1 to 50. Preferably, the molar ratio of the perfluorinated acid anhydride to the ammonium nitrate or the metal nitrate is between about 5 to 1 and 1 to 5; the molar ratio of the ammonium nitrate or metal nitrate to the aromatic compound is between about 3 to 1 and 1 to 8; and the molar ratio of the perfluorinated aliphatic acid anhydride to the aromatic compound is between about 1 to 3 and 10 to 1. Generally there should be present at least 1 mol of the anhydride per mol of the nitrate.

The temperature of the reaction can be also varied widely but it has been found that temperatures between about −10° C. and about 50° C. are more than adequate for the purpose. Generally, ambient or room temperatures are sufficient thereby permitting operation of the process at temperatures ranging from about 20 to 35° C. without the necessity for applying any heat. Since the reaction is somewhat exothermic, any additional heat which may be needed for accelerating the reaction can be derived from the exothermic condition which will result. Generally temperatures above 50 to 60° C. may cause the formation of oxidized products, and heat and condensation reactions leading to loss of some of the desired reaction product.

The reaction is advantageously carried out in a solvent which is inert to the reactants and to the reaction products. Included among such solvents may be mentioned aliphatic hydrocarbons, chlorinated aliphatic hydrocarbons and strongly deactivated aromatic compounds such as nitrobenzene, benzene sulfonic acid, etc. Specific compositions which may be employed for the purpose include chloroform, methylene chloride, acetonitrile, tetrachloroethane, hexane, ethylene dichloride, etc. If desired, the solvent can be the excess perfluorinated aliphatic acid anhydride over and above that necessary to give the desired nitrating effect. The concentration of solvent is not critical and can be varied widely.

In carrying out the reaction, it is generally desirable to add the ammonium or metal nitrate, the aromatic composition, and the perfluorinated aliphatic acid anhydride to the solvent and then to stir the reaction mixture for a period of from a few minutes to about 4 to 5 hours or more until the reaction is completed. The presence of a reflux condenser to take care of the more volatile products formed during the reaction is often desirable. Thereafter, the reaction products are recovered from the reaction mixture by usual means, such as removing the volatile reaction compositions and by-products, as excess perfluoro aliphatic acid anhydride, any perfluoro aliphatic acid which may be formed, solvent, and by-products, such as $NO_2$, etc. Vacuum or slight heat to effect fractional distillation is often employed in this instance. Thereafter, the remaining mixture is advantageously mixed with water and the desired product is extracted with a solvent in which the desired reaction product is soluble.

The nitrated compositions obtained in the practice of the present invention have many uses. Many of them can be used as solvents for other organic reactions. Also the nitrated products can be hydrogenated in the presence of hydrogenation catalysts to convert the nitro group to the corresponding amino group. Aromatic compositions containing these amine radicals can be reacted with compositions, such as aldehydes, to form various resinous compositions useful in the molding and insulation art. The polymers which are treated to introduce nitro groups on the aromatic nucleus are found to have unusual characteristics by virtue of the presence of the nitro group. Thus, nitrated polymers have been found to be more amenable to molding applications and in fact can be converted if desired to the amino derivative which makes them versatile for further reaction with other additives and other polymers.

In order that those skilled in the art can better understand how the present invention may be practiced, the following examples are given by way of illustration and not by way of limitation. All parts are by weight unless otherwise indicated. In the following examples, the percent yield found for the different reactions is calculated on the basis of the inorganic salt used and generally can be related to the following ratio:

$$\text{Percent yield} = \frac{\text{Equivalents of nitrated product formed}}{\text{Equivalents of nitrate charged}}$$

EXAMPLE 1

Into a reaction vessel equipped with stirrer, reflux condenser and drying tube were placed 0.80 gram (0.01 mol) ammonium nitrate, 5 ml. (0.056 mol) benzene, 5 ml. (0.035 mol) trifluoroacetic anhydride (TFAA), and 10 ml. $CHCl_3$. The reaction mixture was stirred for about two hours at ambient temperature (about 25–30° C.) during which time the inorganic salt dissolved and the reaction mixture became homogeneous. Excess trifluoroacetic anhydride was removed by fractional distillation along with some trifluoroacetic acid (TFA) and $CHCl_3$. The remaining liquid was poured into 50 ml. distilled water and extracted three times with 15 ml. portions of $CHCl_3$. There was thus obtained a 95% yield of mononitrobenzene. When the reaction was repeated omitting the TFAA, no detectable nitration occurred.

EXAMPLE 2

In the following example the effect of nitrating benzene with a variety of nitrating media was explored in order to compare the results with those obtained by using the particular system described in the present application. In each of the tests described below, 5 ml. benzene were nitrated with 0.01 mol (0.8 gram) ammonium nitrate in 70 ml. of $CHCl_3$. Test No. 1 used 0.035 mol TFAA, while in the other tests, the TFAA was replaced by 0.035 mol of the designated acid or anhydride. The reactions were carried out with stirring for 2 hours at 25° C., otherwise, the conditions for obtaining the final results were the same as in Example 1. The results of these tests are described in the following Table I.

TABLE I

| Test number | Anhydride | Percent yield nitrobenzene |
|---|---|---|
| 1 | $(CF_3CO)_2O$ | 95 |
| 2 | $(CCl_3CO)_2O$ | 66 |
| 3 | $(Cl_2CHCO)_2O$ | 29 |
| 4 | $(ClCH_2CO)_2O$ | 0 |
| 5 | $(CH_3CO)_2O$ | 0 |
| 6 | $CF_3COOH$ | 69 |
| 7 | $CCl_3COOH$ | 0 |
| 8 | $Cl_2CHCOOH$ | 0 |
| 9 | $ClCH_2COOH$ | 0 |
| 10 | $CH_3COOH$ | 0 |
| 11 [1] | $(CF_3CO)_2O$ | 71 |

[1] Concentrated (98%) $HNO_3$ was substituted for $NH_4NO_3$ in an equimolar amount, based on the $HNO_3$ content.

EXAMPLE 3

Employing the same conditions and molar concentrations of the ammonium nitrate and TFAA as in Example 1, but using 0.01 mol of the aromatic compound instead of 0.056 mol benzene, various organic compounds were subjected to the nitration step employing ammonium nitrate and TFAA. The following Table II shows the various aromatic compounds employed, the time of reaction (which varied), and the products and yields of each reaction. In most of the reaction mixtures, the $CHCl_3$ was omitted. Where $CHCl_3$ was used (10 ml.), this will be indicated in the table by the presence of an asterisk in front of the test number.

TABLE II

| Test No. | Aromatic compound | Time, hours | Product | Percent yield |
|---|---|---|---|---|
| 1 | Toluene | 2 | Nitrotoluene | 88 |
| 2 | Chlorobenzene | 2 | Nitrochlorobenzene | 76 |
| 3 | Nitrobenzene | 2 | No reaction | |
| 4 | Diphenyl | 2 | Nitrodiphenyl (3% dinitrodiphenyl) | 89 |
| *5 | Naphthalene | 4 | Nitronaphthalene | 88 |
| *6 | Diphenylmethane | 2 | Nitrodiphenylmethane | 19 |
|   |   |   | Dinitrodiphenylmethane | 32 |
| 7 | Diphenyloxide | 3 | Nitrodiphenyl oxide | 64 |
|   |   |   | Dinitrodiphenyl oxide | 3 |
| *8 | Propargylphenyl ether | 2 | Nitropropargylphenyl ether | 64 |

EXAMPLE 4

In this example, benzene was nitrated in a reaction medium comprising TFAA and various metallic nitrates. In each instance, the reaction was carried out in the same manner as in Example 1 and the molar concentrations of the benzene and the TFAA were the same as in Example 1, except that equivalent molar concentrations of TFAA were used when nitrates having water of hydration were employed. The following Table III shows the various metallic nitrates employed, the time of reaction, and the yield. In each test, $CHCl_3$ was employed as the solvent in the same concentration as in Example 1.

TABLE III

| Test number | Metal nitrate | Reaction time, hours | Nitrobenzene yield, percent |
|---|---|---|---|
| 1 | $Cu(NO_3)_2 \cdot 3H_2O$ | 5 | 100 |
| 2 | $Cd(NO_3)_2 \cdot 4H_2O$ | 24 | 63 |
| 3 | $Pb(NO_3)_2$ | 15 | 16 |
| 4 | $AgNO_3$ | 15 | 86 |
| 5 | $KNO_3$ | 24 | 000 |
| 6 | $Cr(NO_3)_3 \cdot 9H_2O$ | 24 | 92 |
| 7 | $NaNO_3$ | 15 | 67 |

EXAMPLE 5

In this example, various polymers were subjected to nitrating conditions employing ammonium nitrate, trifluoroacetic anhydride and $CHCl_3$ as solvent. In each instance, the nitration reaction was carried out at a temperature of about 25° C. The molar ratio of the polymers to (1) the ammonium nitrate and (2) to the TFAA was such that there was present at least 1 mol of the nitrate and of the TFAA per mol of the polymer. In each instance, at least one nitro (—$NO_2$) group was introduced per sigma unit into the polymer. Polymer F had introduced three nitro groups per sigma unit as a result of employing 3 mols of the nitrate per 10 mols of the TFAA. The following Table IV shows the results of the nitration including the polymers nitrated, the reaction time, the viscosity of the nitrated polymer before and after nitration measured in $CHCl_3$ (with the exception of one intrinsic viscosity for polymer F which was measured in dimethylformamide). The following constitutes a description of the various polymers which were nitrated and their designation as employed in Table IV. The value $n$ is intended to designate an integer greater than 1.

Polymer A

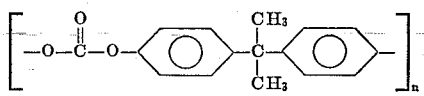

Polymer B

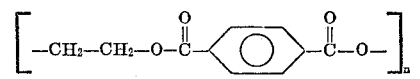

Polymer C

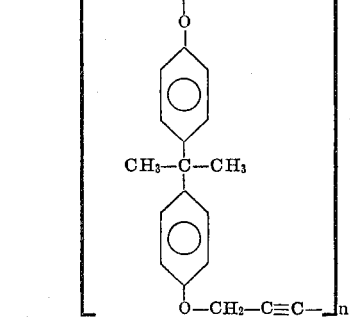

Polymer D

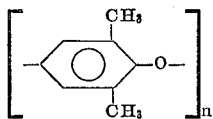

Polymer E

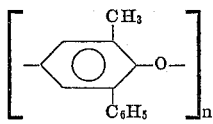

Polymer F

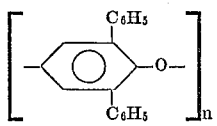

Polymer G

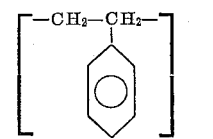

TABLE IV

| Test number | Polymer nitrated | Time of reaction, hours | $[\eta]$a | $[\eta]$b |
|---|---|---|---|---|
| 1 | A | 15 | 0.56 | 0.29 |
| 2 | B | 3 | 0.58 | 0.20 |
| 3 | C | 4 | 0.92 | Same |
| 4 | D | 15 | 0.49 | 0.26 |
| 5 | E | 72 | 0.11 | |
| 6 | F | 15 | 1.10 | 0 95 |
| 7 | G | 15 | 0.19 | 0.18 | a Initial intrinsic viscosity of polymer before nitration.
b Intrinsic viscosity after nitration.

It will of course be apparent to those skilled in the art that other aromatic compounds including polymers containing aromatic groups with benzenoid unsaturation can be nitrated in accordance with the present invention and the nitrating agents such as the metal nitrate and the perfluoro aliphatic acid can vary widely without departing from the scope of the invention. Additionally, the molar concentrations of the aromatic compound, the nitrating agent, and the perfluorinated aliphatic acid anhydride can be varied widely and is not critical as long as there is present a sufficient amount of the perfluorinated aliphatic acid anhydride to react with either the ammonium or the metal ion to make available the nitronium ion for nitrating purposes.

The nitrated compositions of a nonpolymeric nature have many uses including their use as solvents. The nitrated compositions can be reduced to form an amino-substituted derivative which further renders them reactive either by themselves as solvents or for reaction with other compositions to form derivatives thereof.

The nitrated polymers can be employed per se in molding applications where greater flow can be expected from the presence of the nitro groups. Additionally, the nitrate radical can be reduced to an amino group which then adds a greater functionality to the polymer, for instance, for reaction with aldehydes such as formaldehyde, to make aldehyde condensation products. The presence of amino groups renders polymers reactive to aromatic diacyl halides to make polyamides useful in the molding and insulating arts.

What I claim as new and desire to secure by Letters Patent of the United States is:

1. In the process for nitrating organic polymers containing aromatic hydrocarbon or halogenated aromatic hydrocarbon groups in either their backbone structures or as pendant groups, the improvement which comprises treating the aromatic composition with a mixture of ingredients comprising a perfluoro-saturated aliphatic acid anhydride of from 4 to 8 carbon atoms and a nitrating agent selected from the class consisting of metal nitrates and ammonium nitrate.

2. The process as in claim 1 wherein the perfluoro-saturated aliphatic acid anhydride is trifluoro acetic anhydride.

3. The process as in claim 1 wherein the nitrating agent is ammonium nitrate.

4. The process as in claim 1 wherein the perfluoro-saturated aliphatic acid anhydride is trifluoro acetic anhydride and the nitrating agent is ammonium nitrate.

5. The process as in claim 1 wherein the organic polymer is a polyphenylene oxide.

6. The process as in claim 1 wherein the polymer is a polycarbonate resin.

7. The process as in claim 1 wherein the polymer is polystyrene.

8. The process as in claim 1 wherein the polymer is a poly(2,6-diphenylphenylene oxide).

9. The process as in claim 1 wherein the metallic nitrate is potassium nitrate.

References Cited

UNITED STATES PATENTS

| 2,537,309 | 1/1951 | Kropa et al. | 260—645 |
| 3,197,511 | 7/1965 | Tsou et al. | 260—645 |
| 3,634,520 | 1/1972 | Crivello | 260—645 X |
| 3,639,656 | 1/1972 | Bennett | 260—47 E T |

LELAND A. SEBASTIAN, Primary Examiner

U.S. Cl. X.R.

260—46.5 E, 47 R, 47 C, 47 CZ, 47 CB, 78 TF, 78 SC, 93.5 A, 463, 613 R, 645